United States Patent
Ishii

[19]

[11] Patent Number: 6,041,758
[45] Date of Patent: Mar. 28, 2000

[54] FUEL INJECTION AMOUNT CONTROLLER FOR ENGINES

[75] Inventor: Akihiro Ishii, Tokyo, Japan

[73] Assignee: Mitsubishi Denki Kabushiki Kaisha, Tokyo, Japan

[21] Appl. No.: 09/205,229

[22] Filed: Dec. 4, 1998

[30] Foreign Application Priority Data

Jun. 19, 1998 [JP] Japan .................................. 10-173370

[51] Int. Cl.⁷ ............................ F02D 41/10; F02D 41/12; F02D 41/14
[52] U.S. Cl. ......................... 123/492; 123/493; 123/684
[58] Field of Search ..................................... 123/492, 493, 123/682, 683, 684

[56] References Cited

U.S. PATENT DOCUMENTS

| | | | |
|---|---|---|---|
| 4,075,982 | 2/1978 | Asano et al. | 123/682 |
| 4,793,312 | 12/1988 | Doinaga et al. | 123/492 |
| 4,837,698 | 6/1989 | Amano et al. | 123/492 X |
| 5,009,210 | 4/1991 | Nakagawa et al. | 123/492 X |

FOREIGN PATENT DOCUMENTS 2-275036  4/1989  Japan .

*Primary Examiner*—Tony M. Argenbright
*Attorney, Agent, or Firm*—Sughrue, Mion, Zinn, Macpeak & Seas, PLLC

[57] ABSTRACT

A fuel injection amount controller for engines capable of decreasing the shocks caused by the correction of increasing or decreasing the amount of fuel at the time of changing over the operation mode. The fuel injection amount controller includes an operation condition detector for detecting the operation conditions of an engine inclusive of an intake pipe pressure and a crank angle. An air-to-fuel ratio controller controls the air-to-fuel ratio of the engine to a ratio more lean than stoichiometric when operation conditions represent a predetermined operation condition. A pressure deviation detector calculates a pressure deviation in the intake pipe pressure within a predetermined period of time or between predetermined crank angles. A fuel amount correction device injects the fuel in an amount corresponding to the pressure deviation when the deviation is not smaller than a predetermined value. A correction coefficient change-over device changes a correction coefficient for the amount of fuel over to a suppressing direction in response to a timing for changing the operation condition at the stoichiometric air-to-fuel ratio and the operation condition at the lean air-to-fuel ratio over to each other.

4 Claims, 7 Drawing Sheets

FUEL INJECTION AMOUNT CONTROLLER FOR ENGINES

BACKGROUND OF THE INVENTION

1. Field of the Invention

The present invention relates to a fuel injection amount controller for engines, which controls the amount of fuel supplied to an engine of an automobile depending upon the operation condition (stoichiometric mode) at a stoichiometric air-to-fuel mode and the operation condition (lean mode) at a lean air-to-fuel ratio. More particularly, the invention relates to a fuel injection amount controller for engines which reduces torque shock at the time of acceleration and reduces torque shock caused by the correction of deceleration accompanying a change from the lean air-to-fuel ratio over to the stoicheometric air-to-fuel ratio.

2. Prior Art

The engines of automobiles have heretofore been employing a fuel injection amount controller which changes a stoichiometric mode over to a lean mode in order to suppress the consumption of fuel during the high-speed operation condition.

Figure 6:
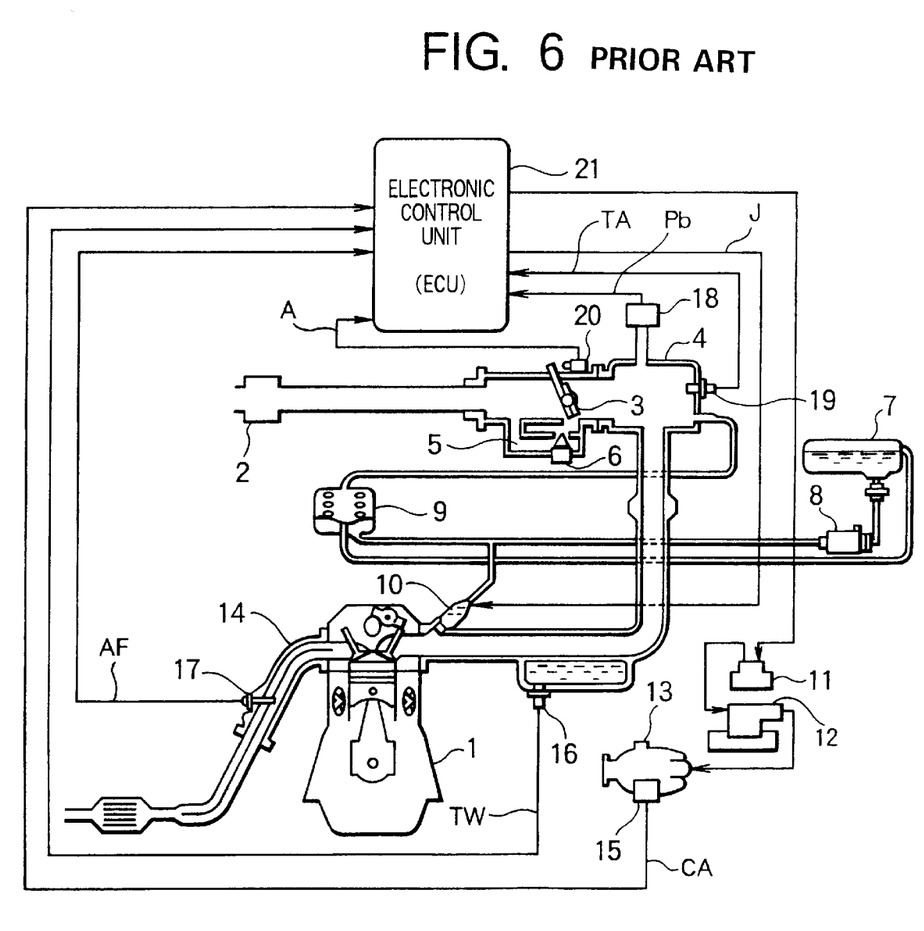
FIG. 6 is a diagram illustrating the constitution of a conventional fuel injection amount controller for engines.

FIG. 6 is a diagram illustrating the constitution of a general fuel injection amount controller for engines. In FIG. 6, an engine 1 mounted on, for example, an automobile, takes in the air for supplying the fuel through an air cleaner 2, a throttle valve 3 and a surge tank 4.

A by-pass 5 is formed between the upstream side and the downstream side of the throttle valve 3. The by-pass 5 includes a solenoid valve 6 to adjust the opening degree of the by-pass 5.

During the idling operation of the engine 1, the throttle valve 3 is closed, and the opening degree of the by-pass 5 is adjusted by the solenoid valve 6, so that the air for combustion is supplied to the engine 1 in an amount corresponding to the opening degree of the by-pass 5.

The fuel in a fuel tank 7 is fed through a fuel pump 8, is adjusted to a predetermined injection pressure by a pressure regulator 9, and is injected through an injector 10 provided for each of the cylinders of the engine 1.

An ignition signal formed by an ECU (electronic control unit) 21 for every ignition timing is applied to a spark plug (not shown) provided for each of the cylinders of the engine 1 through an ignition drive circuit 11, an ignition coil 12 and a distributor 13.

Exhaust gases formed in the engine 1 after the combustion are released to the open air through an exhaust manifold 14 and the like.

A crank angle sensor 15 detects the rotational speed of the crank shaft of the engine 1, and forms pulse signals of a frequency corresponding to the rotational speed as crank angle signals CA.

The crank angle signal CA comprises a pulse signal which rises at BTDC (before top dead center) 75° and breaks at BTDC 5°.

A cooling water temperature sensor 16 detects the cooling water temperature TW of the engine 1. An air-to-fuel ratio sensor 17 installed in the exhaust manifold 14 detects the concentration of oxygen in the exhaust gases as air-to-fuel ratio data AF. A pressure sensor 18 installed in a surge tank 4 detects the pressure in the intake pipe in terms of the absolute pressure and outputs a pressure detection signal of a voltage that varies depending upon the pressure Pb in the intake pipe.

An intake air temperature sensor 19 installed in the surge tank 4 detects the temperature TA of the air that is taken in. An idle switch 20 provided close to the throttle valve 3 detects the closure of the throttle valve 3 during the idling operation, and outputs an idle signal A.

Various detection signals from various sensors 15 to 19 inclusive of the idle switch 20 are fed to the ECU 21 as data representing the operation conditions of the engine 1.

The ECU 21 determines, based on the detection signals, the amount of fuel injection that varies depending upon the operation conditions, and controls the valve-opening time of the injector 10 to adjust the amount of the fuel injected into the engine 1. The ECU 21 controls the driving of the ignition drive circuit 11.

Figure 7:
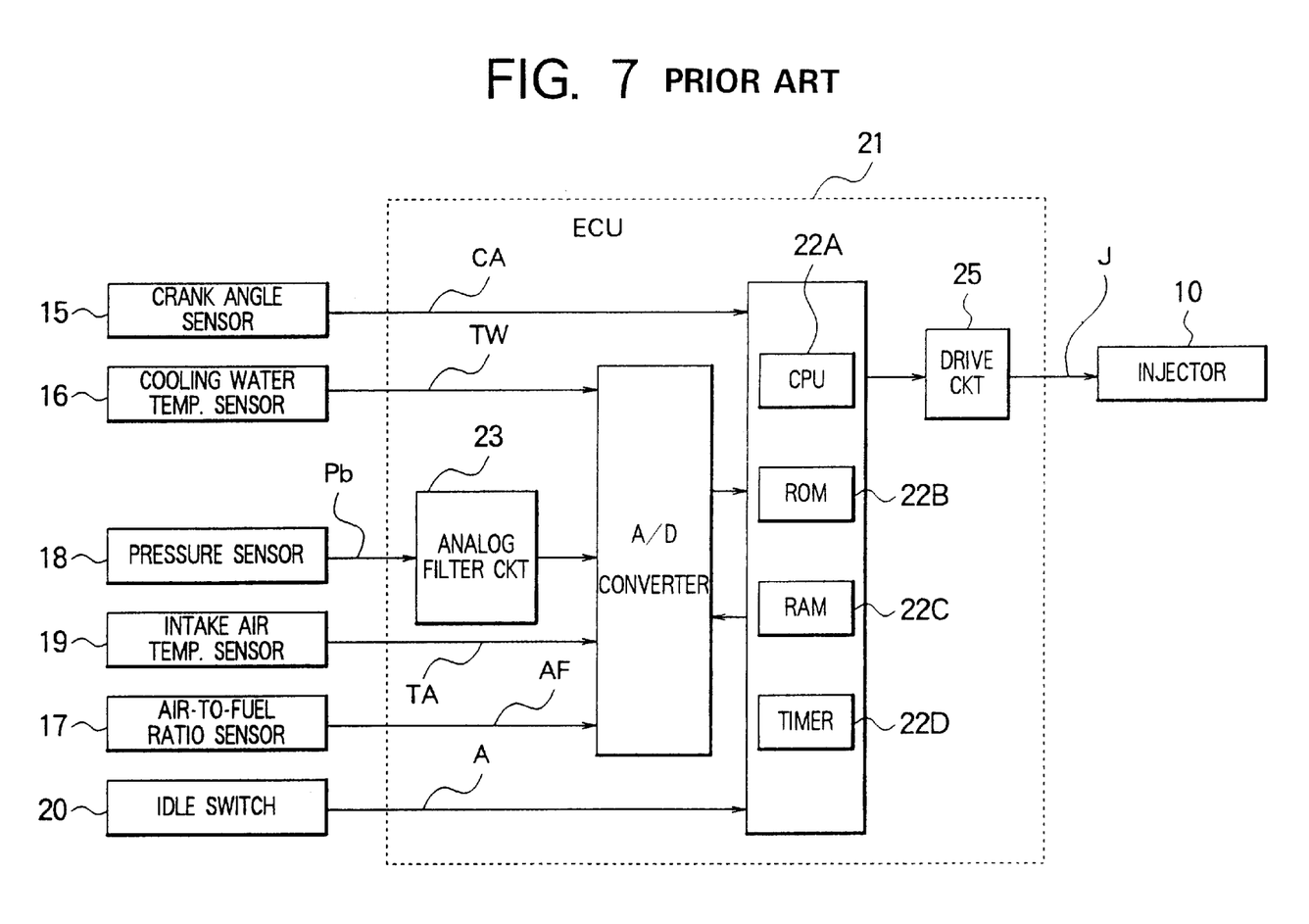
FIG. 7 is a block diagram illustrating the constitution of an ECU in the conventional fuel injection amount controller for engines.

FIG. 7 is a block diagram illustrating in detail the constitution of the ECU 21. Here, a fuel control unit only is shown as an output unit.

In FIG. 7, the ECU 21 is constituted by a microcomputer 22, an analog filter circuit 23, an A/D converter 24 and a drive circuit 25.

The microcomputer 22 constitutes the main body of the ECU 21 and executes a variety of operations and judging processings.

The analog filter circuit 23 permits the pressure detection signal (intake pipe pressure Pb) from the pressure sensor 18 to be input to the A/D converter 24 while decreasing the ripples.

The A/D converter 24 successively converts the analog detection signal, i.e., intake air temperature TA, cooling water temperature TW, air-to-fuel ratio signal AF and intake pipe pressure through the analog filter circuit 23, into digital values, and sends them to the microcomputer 22.

The drive circuit 25 outputs a drive signal J for the injector 10.

The input ports of the microcomputer 22 are connected to the output terminals of the crank angle sensor 15, idle switch 20 and A/D converter 24.

The output ports of the microcomputer 22 are connected to the A/D converter 24 for sending reference signals and are further connected to the input terminal of the drive circuit 25.

The microcomputer 22 is constituted by a CPU 22A for executing a variety of operations and judgements, a ROM 22B storing the operation flow program of the CPU 22A, a RAM 22C functioning as a work memory, and a timer 22D to which the valve-opening time of the injector 10 has been set in advance.

Described below is a concrete operation of the ECU 21 by a conventional fuel injection amount controller for engines.

In the case of the device disclosed in, for example, Japanese Unexamined Patent Publication (Kokai) No. 275036/1990, when a deviation in the intake pipe pressure Pb in a predetermined period of time or between predetermined crank angles is greater than a predetermined value, it is so judged that the engine is in a transient condition (accelerating or decelerating condition), and the fuel injection amount is increased or decreased depending upon the deviation of the intake pipe pressure Pb.

According to the conventional device disclosed in the above-mentioned publication, the correction coefficient is not changed over depending upon the operation conditions at the time of acceleration or deceleration.

That is, when the operation condition is changed from the stoichiometric mode over to the lean mode during the acceleration operation, acceleration is judged due to a rise in the intake pipe pressure Pb accompanying an increase in the amount of the intake air, and the amount of the fuel is increased at the time of acceleration.

Furthermore, when the operation condition is changed from the lean mode over to the stoichiometric mode during the deceleration operation, the operation is judged to be the deceleration due to a decrease in the intake pipe pressure Pb accompanying a decrease in the amount of the intake air, and the amount of the fuel is decreased at the time of deceleration.

When a deviation in the pressure in the intake pipe becomes greater than a predetermined value as described above, it is so judged that the engine 1 is in a transient operation condition (accelerating or decelerating condition), and the amount of the fuel supplied to the engine 1 is increased or decreased depending upon a deviation $\Delta Pb$ in the intake pipe pressure Pb.

When the stoichiometric mode is changed over to the lean mode at the time of acceleration, however, the air-to-fuel ratio is becoming rich due to an increase in the fuel injection amount. Therefore, the stoichiometric air-to-fuel ratio is not smoothly changed over to the lean air-to-fuel ratio, giving rise to the occurrence of an acceleration shock.

When the lean mode is changed over to the stoichiometric mode at the time of deceleration, furthermore, the air-to-fuel ratio is becoming lean due to a decrease in the fuel injection amount. Therefore, the lean air-to-fuel ratio is not smoothly changed over to the stoichiometric air-to-fuel ratio, giving rise to the occurrence of a deceleration shock.

Figure 8:
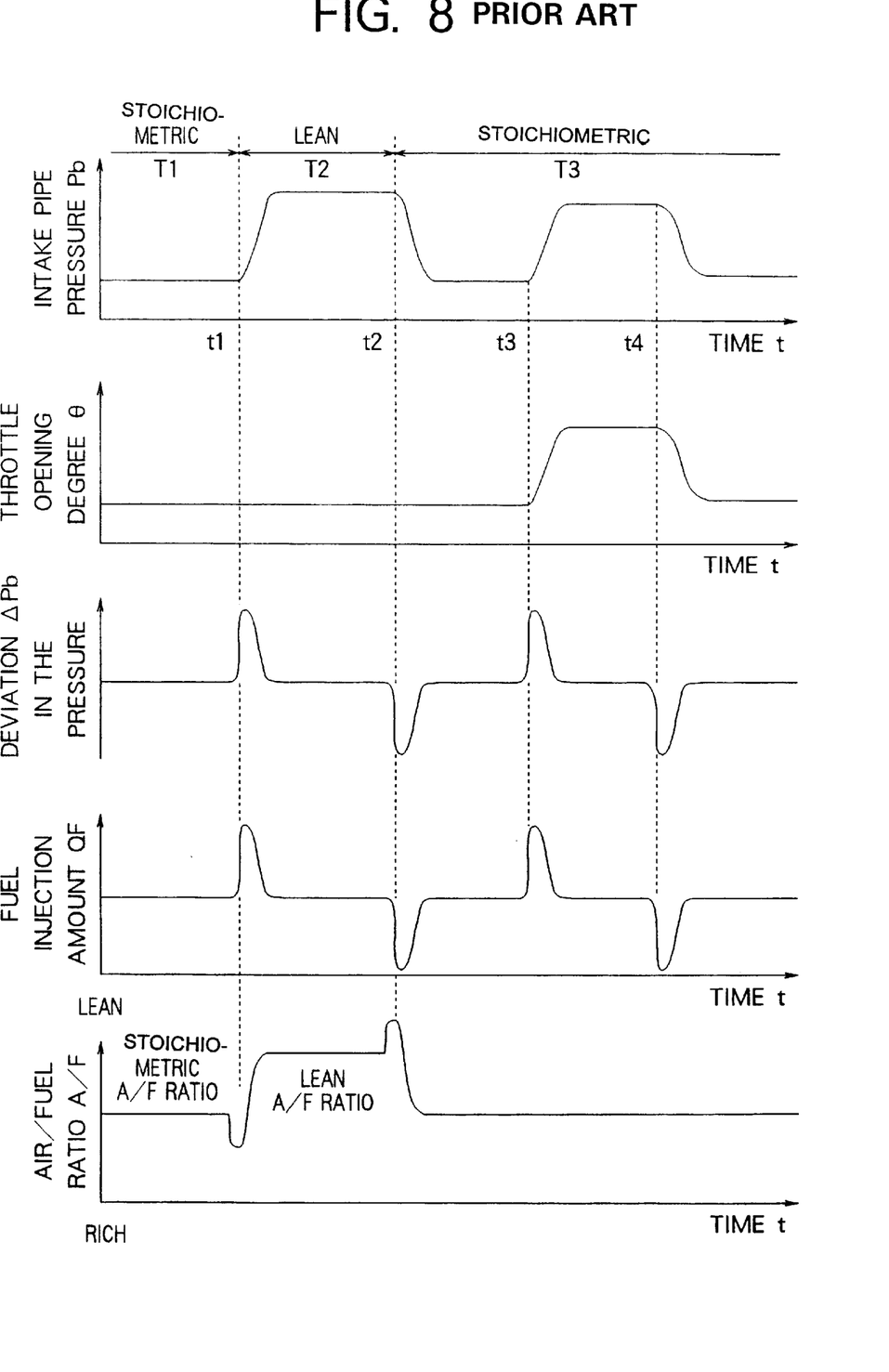
FIG. 8 is a timing chart illustrating the operation for correcting the amount of the fuel based on the conventional fuel injection amount controller for engines.

FIG. 8 is a timing chart illustrating the operation for correcting the amount of the fuel by the above-mentioned conventional device, and illustrates changes in the intake pipe pressure Pb, in the opening degree $\theta$ of the throttle valve 3, in the deviation $\Delta Pb$ in the pressure, in the fuel injection amount QF and in the air-to-fuel ratio A/F with the passage of time.

In FIG. 8, a stoichiometric mode section T1 is changed over to a lean mode section T2 at a timing t1, and the lean mode section T2 is changed over to a stoichiometric mode section T3 at a timing t2.

The throttle opening degree $\theta$ is opened at a timing t3 as the accelerator pedal is depressed, and the throttle opening degree $\theta$ is closed at a timing t4 as the accelerator pedal is released.

In the stoichiometric mode sections T1 and T3, the air-to-fuel ratio A/F is controlled to be a stoichiometric air-to-fuel ratio ($\approx$14.7). In the lean mode section T2, the air-to-fuel ratio A/F is controlled to be a lean air-to-fuel ratio (>14.7).

At the timing t1 when the stoichiometric mode section T1 (operation condition at the stoichiometric air-to-fuel ratio) is changed over to the lean mode section T2 (operation condition at the lean air-to-fuel ratio), the amount of the fuel is increased at the time of acceleration and, hence, the air-to-fuel ratio A/F becomes rich and rapidly decreases.

Accordingly, the stoichiometric air-to-fuel ratio is not smoothly changed over to the lean air-to-fuel ratio, and an acceleration shock takes place.

At the timing t2 when the lean mode section T2 (operation condition at the lean air-to-fuel ratio) is changed over to the stoichiometric mode section T3 (operation condition at the stoichiometric air-to-fuel ratio), the amount of the fuel is decreased at the time of deceleration and, hence, the air-to-fuel ratio A/F becomes lean and rapidly increases.

Accordingly, the lean air-to-fuel ratio is not smoothly changed over to the stoichiometric air-to-fuel ratio, and a deceleration shock takes place.

SUMMARY OF THE INVENTION

As described above, the conventional fuel injection amount controller for engines has a problem in that it is not capable of smoothly changing over the air-to-fuel ratio A/F at the time of changing over the operation mode, giving rise to the occurrence of an acceleration shock or a deceleration shock.

The present invention was accomplished in order to solve the above-mentioned problem, and its object is to provide a fuel injection amount controller for engines capable of decreasing the shock caused by an increase or a decrease in the amount of the fuel at the time of changing over the operation mode.

According to the present invention, a fuel injection amount controller for engines comprises:

an operation condition detection means for detecting the operation conditions of an engine inclusive of an intake pipe pressure and a crank angle;

an air-to-fuel ratio control means for controlling the air-to-fuel ratio of said engine into a lean air-to-fuel ratio more lean than a stoichiometric air-to-fuel ratio when said operation conditions represent a predetermined operation condition;

a pressure deviation calculation means for calculating a pressure deviation in said intake pipe pressure within a predetermined period of time or between predetermined crank angles;

a fuel amount correction means for injecting, into said engine, the fuel in an amount corresponding to said pressure deviation when said pressure deviation is not smaller than a predetermined value; and a correction coefficient change-over means for changing a correction coefficient for said amount of fuel over to a suppressing direction in response to a timing for changing the operation condition at said stoichiometric air-to-fuel ratio and the operation condition at said lean air-to-fuel ratio over to each other.

In the fuel injection amount controller for engines according to the present invention, said fuel amount correction means judges said engine to be in an accelerating condition when said pressure deviation exhibits an increase greater than a predetermined value, and increases the amount of the fuel depending upon said pressure deviation.

In the fuel injection amount controller for engines according to the present invention, furthermore, said fuel injection amount correction means judges said engine to be in a decelerating condition when said pressure deviation exhibits a decrease greater than a predetermined value, and decreases the amount of the fuel depending upon said pressure deviation, and said correction coefficient change-over means includes a time counting means for counting the passage of time after the operation condition at said lean air-to-fuel ratio has changed over to the operation condition at said stoichiometric air-to-fuel ratio, and changes said correction coefficient over to a suppressing direction when said passage of time is not longer than a predetermined period of time.

In the fuel injection amount controller for engines according to the present invention, furthermore, said fuel amount correction means judges said engine to be in an accelerating condition when said pressure deviation exhibits an increase greater than a predetermined value, and increases the amount of the fuel depending upon said pressure deviation, and judges said engine to be in a decelerating condition when said pressure deviation exhibits a decrease greater than a predetermined value, and decreases the amount of the fuel depending upon said pressure deviation, and said correction coefficient change-over means includes a time counting means for counting the passage of time after the operation condition at said lean air-to-fuel ratio has changed over to the operation condition at said stoichiometric air-to-fuel ratio, and changes said correction coefficient over to a suppressing direction when said passage of time is not longer than a predetermined period of time.

EMBODIMENTS OF THE INVENTION

Embodiment 1.

An embodiment 1 of the present invention will now be described with reference to the drawings.

Figure 1:
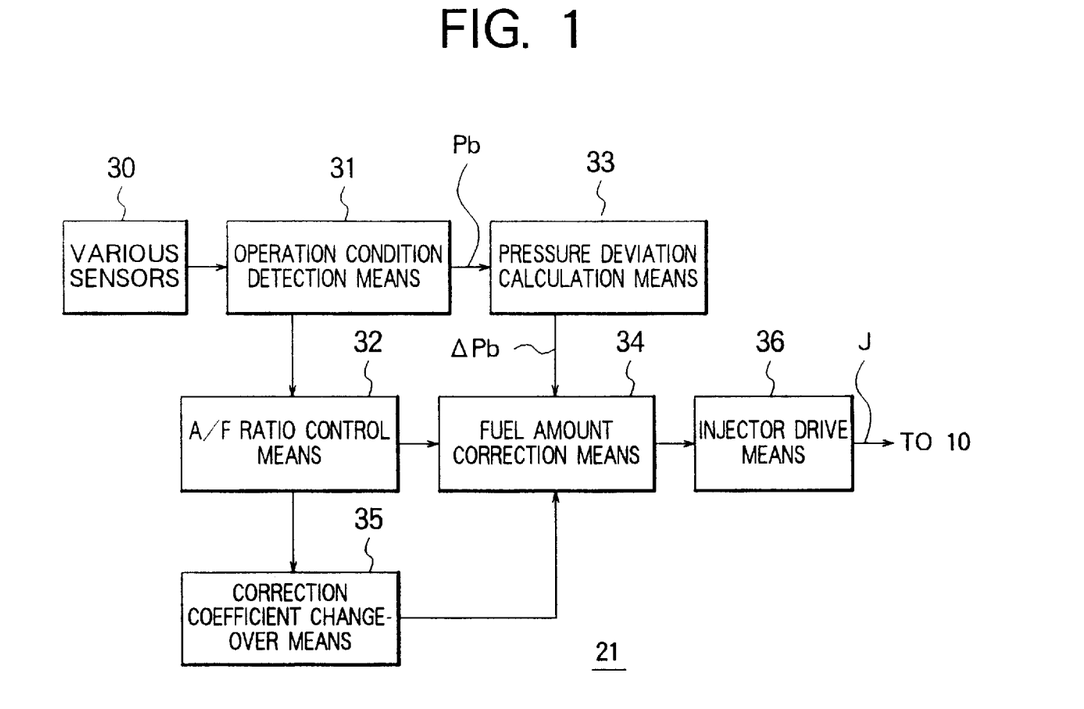
FIG. 1 is a functional block diagram illustrating an embodiment 1 of the present invention.

FIG. 1 is a functional block diagram illustrating the constitution of an ECU 21 according to the embodiment 1 of the present invention.

Here, the microcomputer and the operation program of the CPU in the ECU 21 are partly different from those described above and, hence, the constitution that is not diagramed is as illustrated in FIGS. 6 and 7.

In FIG. 1, the ECU 21 includes an operation condition detection means 31, an air-to-fuel ratio control means, a pressure deviation calculation means 33, a fuel amount correction means 34, a correction coefficient change-over means 35 and an injector drive means 36.

Based upon the detection data from various sensors 30, therefore, the ECU 21 outputs a drive signal J for the injector 10 to control the fuel injection amount.

The operation condition detection means 31 detects the operation conditions of the engine 1 (see FIG. 1) based on the detection data (intake pipe pressure Pb, crank angle signal CA, etc.) from various sensors 30.

When the operation condition represents a predetermined operation condition, the air-to-fuel ratio control means 32 controls the air-to-fuel ratio of the engine 1 to be a lean air-to-fuel ratio which is more lean than a stoichiometric air-to-fuel ratio ($\approx 14.7$).

The pressure deviation calculation means 33 calculates a pressure deviation $\Delta Pb$ in the intake pipe pressure Pb within a predetermined period of time or between predetermined crank angles.

When the pressure deviation $\Delta Pb$ is not smaller than a predetermined value, the fuel amount correction means 34 so controls the injector drive signal J that the fuel is injected into the engine 1 in an amount corresponding to the pressure deviation $\Delta Pb$.

The correction coefficient change-over means 35 changes the correction coefficient for the amount of fuel over to a suppressing direction in response to a timing for changing the operation condition (stoichiometric mode) at a stoichiometric air-to-fuel ratio and the operation condition (lean mode) at a lean air-to-fuel ratio over to each other.

The correction coefficient for the amount of fuel includes an increment correction coefficient corresponding to the acceleration condition and a decrement correction coefficient corresponding to the deceleration condition, and is so set that the absolute value thereof becomes smaller during the period of changing over the operation mode in which the correction coefficient should be suppressed.

The injector drive means 36 outputs an injector drive signal J in response to an output signal from the fuel amount correction means 34 which operates based upon the air-to-fuel ratio control means 32, pressure deviation calculation means 33 and correction coefficient change-over means 35, so that the fuel injection amount becomes in agreement with a final target air-to-fuel ratio.

Next, the operation of the embodiment 1 of the present invention shown in FIG. 1 will be described with reference to the above-mentioned FIGS. 6 and 7 as well as flow charts of FIGS. 2 to 4 and a timing chart of FIG. 5.

Figure 2:
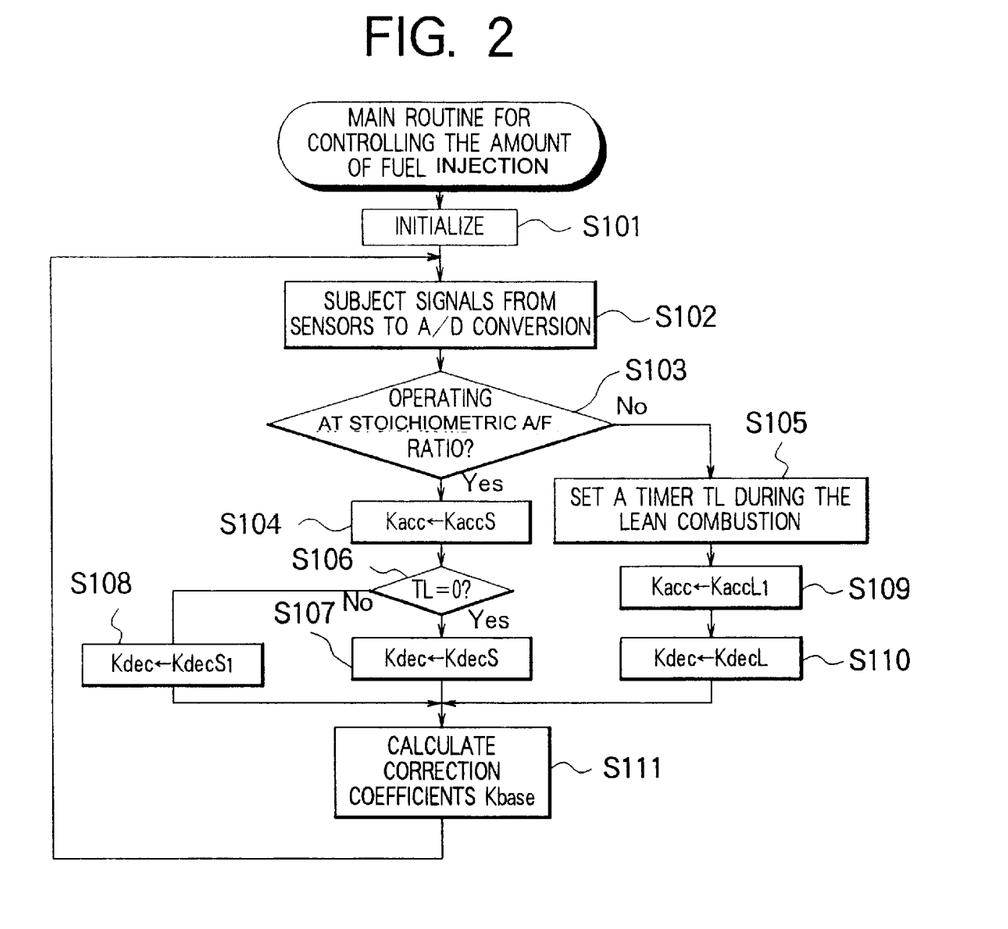
FIG. 2 is a flow chart illustrating a main routine according to the embodiment 1 of the present invention.
Figure 3:
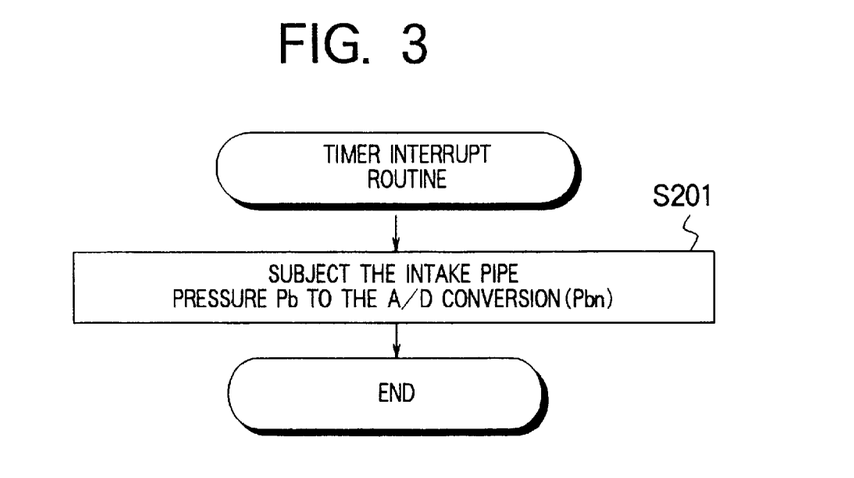
FIG. 3 is a flow chart illustrating a timer interrupt routine according to the embodiment 1 of the present invention.
Figure 4:
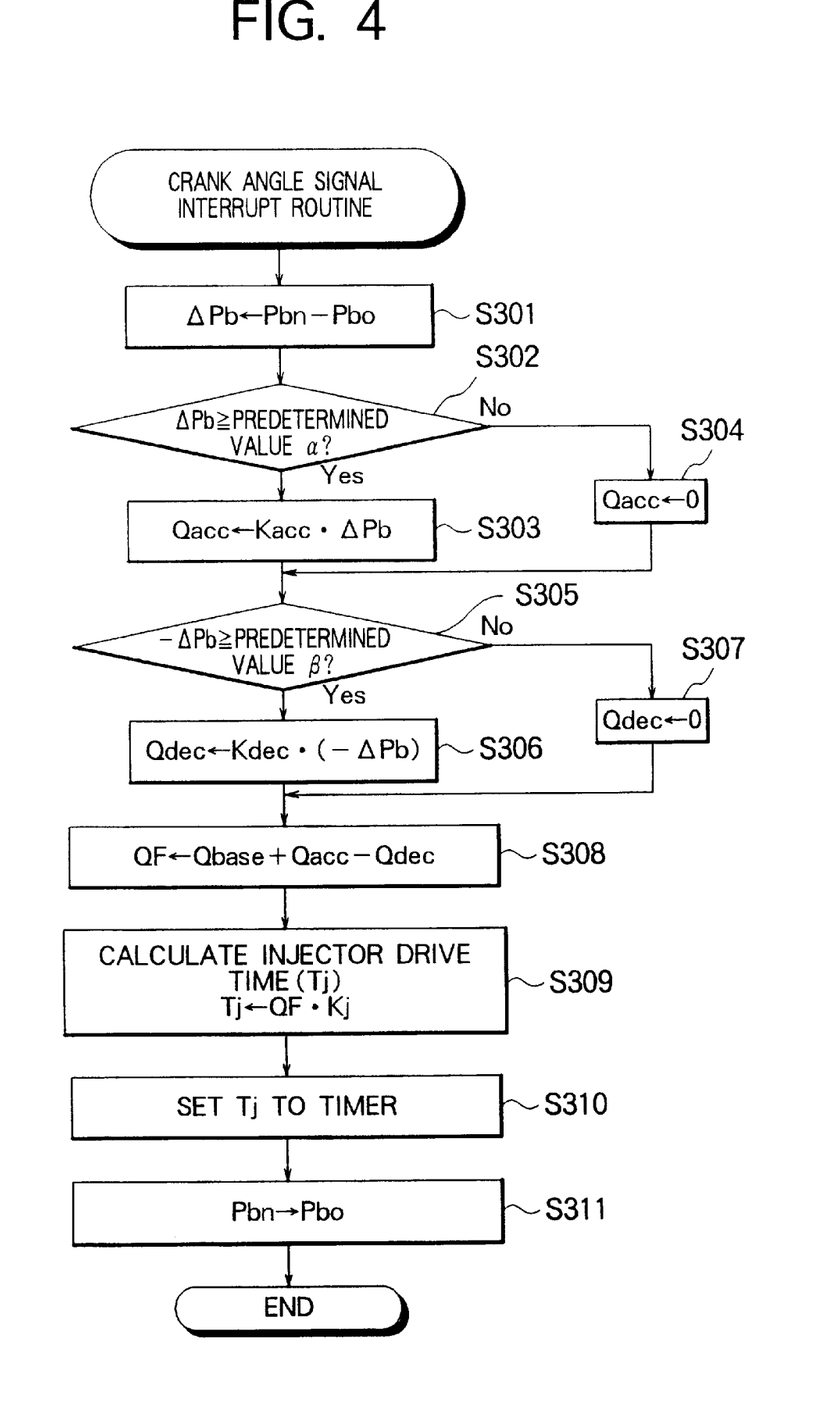
FIG. 4 is a flow chart illustrating a crank angle signal interrupt routine according to the embodiment 1 of the present invention.

FIG. 2 illustrates a main routine for controlling the fuel injection amount, FIG. 3 illustrates a timer interrupt routine processed for every predetermined period of time or for every predetermined crank angle, and FIG. 4 illustrates a crank angle signal interrupt routine processed in synchronism with the crank angle signal CA. FIG. 5 corresponds to the above-mentioned FIG. 8.

In FIG. 2, steps S104 to S111 correspond to the operation of the correction coefficient change-over means 35 in FIG. 1.

In FIG. 4, furthermore, steps S301 and S311 correspond to the operation of the pressure deviation calculation means 33, steps S302 to S308 correspond to the operation of the fuel amount correction means 34, and steps S309 and S310 correspond to the operation of the injector drive means 36.

In the ROM 22B (see FIG. 7) in the ECU 21 have been stored an increment correction coefficient KaccS at the time of acceleration in the operation condition (stoichiometric mode) at the stoichiometric air-to-fuel ratio, a decrement correction coefficient KdecS at the time of deceleration, and a decrement correction coefficient KdecS1 immediately after the deceleration (within a predetermined period of time).

Among these correction coefficients for the stoichiometric mode, the increment correction coefficient KaccS and the decrement correction coefficient KdecS are set to normal values, and the decrement correction coefficient KdecS1 immediately after the deceleration is set to a value smaller than the normal value (or is set to 0).

In the ROM 22B have been further stored an increment correction coefficient KaccL1 at the time of acceleration under the operation condition (lean mode) at the lean air-to-fuel ratio and a decrement correction coefficient KdecL at the time of deceleration. Among them, the increment correction coefficient KaccL1 is set to a value (or 0) smaller than a normal value, the decrement correction coefficient KdecL is set to a normal value, and the decrement correction coefficient KdecS1 immediately after the deceleration is set to a normal value.

When a power source (battery mounted on a car that is not shown) is connected, the microcomputer 22 (see FIG. 7) in the ECU 21 drives the main routine for controlling the fuel injection amount shown in FIG. 2.

At a step S101, first, the RAM 22C is initialized by clearing the content thereof and at a step S102, the data from various sensors 30 (detection signals from the cooling water temperature sensor 16, intake air temperature sensor 19 and air-to-fuel ratio sensor 17) are successively subjected to the A/D conversion through the A/D converter 24 and are stored in the RAM 22C.

Then, at a step S103, it is judged whether the present operation condition is the one (stoichiometric mode) at the stoichiometric air-to-fuel ratio. When the operation condition is judged to be the stoichiometric mode (i.e., YES), the program proceeds to a step S104. When the operation condition is judged to be the lean mode (i.e., NO), the program proceeds to a step S105.

At the step S104 of the case of the stoichiometric mode, the increment correction coefficient KaccS at the time of acceleration in the stoichiometric mode is read out from the ROM 22B and is stored as the increment correction coefficient Kacc in the RAM 22C.

At the step S105 in the case of the lean mode, on the other hand, a timer during the lean combustion is set to a predetermined period of time.

In the case of the stoichiometric mode, furthermore, it is judged at a step S106 that follows the step S104 whether the timer TL (subtracted after every predetermined period of time) during the lean combustion set at the step S105 has reached 0 or not.

The program proceeds to a step S107 when it is judged at the step S106 that TL is 0 (i.e., YES) and when the predetermined period of time has elapsed after the change of the lean mode over to the stoichiometric mode. The program, on the other hand, proceeds to a step S108 when it is judged that TL>0 (i.e., NO) but when the predetermined period of time has not elapsed after the change over to the stoichiometric mode.

At the step S107, the decrement correction coefficient KdecS in the stoichiometric mode during the deceleration is read out from the ROM 22B and is stored as the decrement correction coefficient Kdec in the RAM 22C.

At the step S108, on the other hand, the decrement correction coefficient KdecS1 (<KdecS) in the stoichiometric mode immediately after the deceleration is read out from the ROM 22B and is stored as the decrement correction coefficient Kdec in the RAM 22C.

When the operation condition is judged to be the lean mode at the step S103, an increment correction coefficient KaccL1 (<KaccS) in the lean mode during the acceleration is read out from the ROM 22B at a step S109 that follows the step S105, and is stored as the increment correction coefficient Kacc in the RAM 22C.

Then, at a step S110, the decrement correction coefficient KdecL (>KdecS1) in the lean mode during the deceleration is read out from the ROM 22B and is stored as the decrement correction coefficient Kdec in the RAM 22C.

Thus, the increment correction coefficient Kacc or the decrement correction coefficient Kdec is set at the steps S104, and S107 to S110.

Among them, the decrement correction coefficient KdecS1 (step S108) immediately after the deceleration at the time of changing over the stoichiometric mode and the increment correction coefficient KaccL1 during the acceleration in the lean mode, assume suppressed values (or 0).

Finally at a step S111, the data from various sensors 30 are successively read out from the RAM 22C, and final correction coefficients Kbase for calculating a basic amount of fuel (described later) are calculated based upon the detected operation conditions and the increment correction coefficient Kacc or the decrement correction coefficient Kdec in the RAM 22C, and are stored in the RAM 22C.

After the execution at the step S111, the program returns back to the step S102 to repeat the abovementioned processing operation.

When the vehicle is accelerated in the lean mode without changing over the operation mode by depressing the accelerator pedal to increase the throttle opening degree θ, too, the increment correction coefficient Kacc is suppressed by the step S109 without, however, involving any problem.

The ECU 21 generates an interrupt signal for every timing period (e.g., 2.5 msec) for subjecting the intake pipe pressure Pb to the A/D conversion, and executes the timer interrupt routine of FIG. 3 in response to the interrupt signal.

That is, at the step S201, the intake pipe pressure Pb that has passed through an analog filter circuit 23 is converted through the A/D converter 24 into a digital pressure data Pbn. The pressure data Pbn is stored in the RAM 22C, and the interrupt processing routine of FIG. 3 ends.

The ECU 21 further generates a crank angle interrupt signal for every rise of the crank angle signal CA to execute a routine for processing the crank angle signal interrupt of FIG. 4.

At a step S301, first, a pressure deviation ΔPb between a pressure data Pbn subjected to the digital conversion this time and a pressure data Pbo at the time of crank angle interrupt in the previous time, is calculated in compliance with the following formula (1) and is stored in the RAM 22C.

$$\Delta Pb = Pbn - Pbo \qquad (1)$$

Then, at a step S302, it is determined whether ΔPb is greater than a predetermined value α (acceleration) or not. When it is determined that ΔPb≧α (i.e., YES), the program proceeds to a step S303. When it is determined that ΔPb<α (i.e., NO), the program proceeds to a step S304.

At the step S303, the increment correction amount Qacc for the fuel injection amount during the acceleration is calculated from a product of the pressure deviation ΔPb and the increment correction coefficient Kacc in compliance with the following formula (2), and is stored in the RAM 22C. The program then proceeds to a step S305.

$$Qacc = \Delta Pb \cdot Kacc \qquad (2)$$

During the acceleration in, for example, the lean mode, the increment correction coefficient Kacc has been suppressed from the formula (2) due to the step S109 in FIG. 2 and, hence, the increment correction quantity Qacc is controlled, too.

On the other hand, when it is determined at the step S302 that ΔPb<α (not being accelerated), the program proceeds to the step S304 where the increment correction amount Qacc during the acceleration that is cleared to 0 is stored in the RAM 22C, and the program proceeds to the step S305.

At the step S305, it is determined whether a value (−ΔPb) obtained by inverting the polarity of the pressure deviation ΔPb is greater than a predetermined value β (deceleration) or not. When it is so judged that −ΔPb>β (i.e., YES), the program proceeds to a step 306. When it is so judged that −ΔPb<β (i.e., NO), the program proceeds to a step 307.

At the step S306, the decrement correction amount Qdec for the fuel injection amount during the deceleration is calculated from a product of the pressure deviation (−ΔPb)

and the decrement correction coefficient Kdec in compliance with the following formula (3), and is stored in the RAM 22C. The program then proceeds to a step S308.

$$Qdec=Kdec\cdot(-\Delta Pb) \quad (3)$$

Immediately after the deceleration in, for example, the stoichiometric mode, the decrement correction coefficient Kdec has been suppressed at the step S108 of FIG. 2 in compliance with the formula (3). Therefore, the decrement correction amount Qdec is suppressed, too.

When it is judged at the step S305 that $-\Delta Pb<\beta$ (not being decelerated), on the other hand, the program proceeds to the step S307 where the decrement correction amount Qdec during the deceleration cleared to 0 is stored in the RAM 22C, and the program proceeds to the step S308.

At the step S308, the increment correction amount Qacc is added to, and the decrement correction amount Qdec is subtracted from, the basic fuel injection amount Qbase found from the correction coefficients Kbase in a manner as represented by the following formula (4), and the obtained value is stored as a fuel injection amount QF in the RAM 22C.

$$QF=Qbase+Qacc-Qdec \quad (4)$$

Then, at a step S309, a drive conversion coefficient Kj corresponding to the fuel injection amount from the injector 10 is read out from the ROM 22B, and is multiplied to the fuel injection amount QF obtained from the formula (4) thereby to calculate an injector drive time Tj in compliance with the following formula (5). The injector drive time Tj is then stored in the RAM 22C.

$$Tj=QF\cdot Kj \quad (5)$$

Next, at a step S310, the injector drive time Tj is set to the timer 22D in order to operate the timer 22D for the injector drive time Tj only.

While the timer 22D is in operation, the drive circuit 25 (injector drive means 36) applies the drive signal J comprising a pulse signal to the injector 10, so that the fuel is injected from the injector 10 into the engine 1 for only the injector drive time Tj.

Finally at a step S311, the pressure data Pbn of this time is stored as the pressure data Pbo of the previous time in the RAM 22C to end the interrupt processing routine of FIG. 4.

Figure 5:
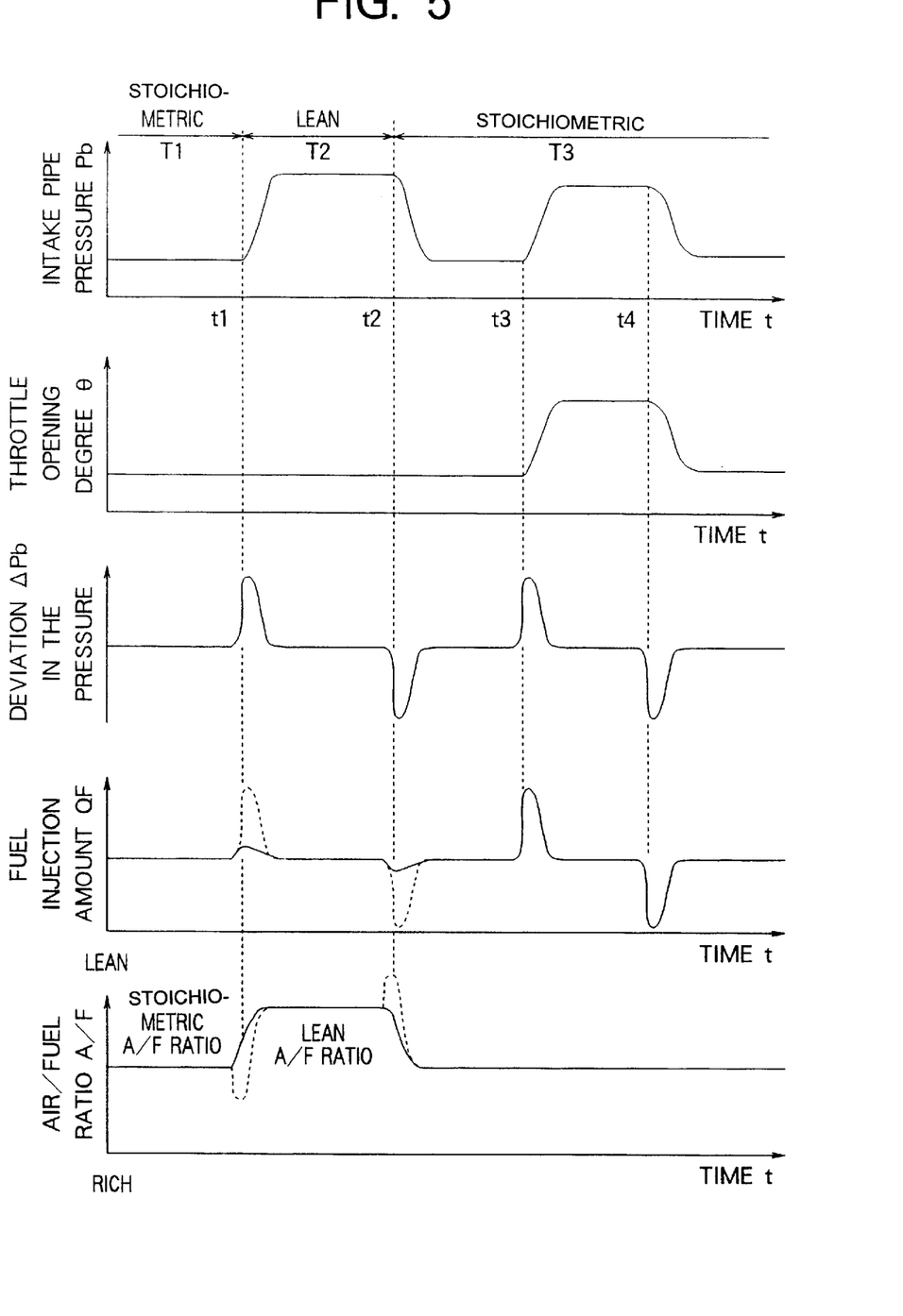
FIG. 5 is a timing chart illustrating the operation for correcting the amount of the fuel according to the embodiment 1 of the present invention.

FIG. 5 illustrates the operation for controlling the fuel injection amount as a change in the time, and shows changes in the fuel injection amount QF, in the throttle opening degree θ and in the air-to-fuel ratio A/F relative to changes in the operation mode, in the intake pipe pressure Pb (pressure data) and in the throttle opening degree θ.

Referring to the fuel injection amount QF and the air-to-fuel ratio A/F in FIG. 5, broken lines represent changes in the conventional operation.

In this case, as described above, the increment correction coefficient Kacc during the acceleration after the stoicheometric mode is changed over to the lean mode (after the time t1) and the decrement correction coefficient Kdec during the deceleration within a predetermined period of time after the lean mode is changed over to the stoicheometric mode (after the time t2), have been set to small suppressed values (or 0).

At the time t1, therefore, despite the pressure deviation ΔPb greater than the predetermined value α is detected, the increment correction coefficient Kacc at the time of acceleration is suppressed and the fuel injection amount QF is suppressed. Therefore, the air-to-fuel ratio A/F is not caused to become as rich as indicated by broken lines.

At the time t2, furthermore, despite the pressure deviation (−ΔPb) greater than the predetermined value β is detected, the decrement correction coefficient Kdec is suppressed immediately after the deceleration and the decrement of the fuel injection amount QF is suppressed. Therefore, the air-to-fuel ratio A/F is not caused to become as lean as indicated by broken lines.

This makes it possible to decrease the acceleration shock caused by the fuel increment correction at the time of acceleration when changed over to the lean mode and to decrease the deceleration shock caused by the fuel decrement correction at the time of deceleration when changed over to the stoichiometric mode.

Based on a change in the intake pipe pressure Pb caused by the change-over of the operation condition, the increment correction coefficient Kacc during the acceleration and the decrement correction coefficient Kdec during the deceleration are set to small values (or 0), so that the operation condition can be smoothly changed over.

When the pressure deviation ΔPb (or −ΔPb) greater than the predetermined value α (or β) is detected depending upon the throttle opening degree θ of the throttle valve 3, the increment correction amount (or decrement correction amount) during the acceleration (or deceleration) is set in a customary manner and is, hence, readily reflected in the fuel injection amount QF at the time t3 (or at the time t4).

When the predetermined period of time has passed from the time t2 of change over to the stoichiometric mode, the air-to-fuel ratio A/F is stabilized and its change decreases. Therefore, the fuel injection amount is set with a normal correction coefficient during either the acceleration or the deceleration.

Embodiment 2.

In the above-mentioned embodiment 1, the shock caused by the change-over of operation mode was suppressed at the time of acceleration and deceleration. It is, however, also allowable to suppress the shock caused by the change-over of the operation mode at the time of either acceleration or deceleration.

I claim:

1. A fuel injection amount controller for engines comprising:

an operation condition detection means for detecting the operation conditions of an engine inclusive of an intake pipe pressure and a crank angle;

an air-to-fuel ratio control means for controlling the air-to-fuel ratio of said engine into a lean air-to-fuel ratio more lean than a stoichiometric air-to-fuel ratio when said operation conditions represent a predetermined operation condition;

a pressure deviation calculation means for calculating a pressure deviation in said intake pipe pressure within a predetermined period of time or between predetermined crank angles;

a fuel amount correction means for injecting, into said engine, the fuel in an amount corresponding to said pressure deviation when said pressure deviation is not smaller than a predetermined value; and a correction coefficient change-over means for changing a correction coefficient for said amount of fuel over to a suppressing direction in response to a timing for chang ing the operation condition at said stoichiometric air-to-fuel ratio and the operation condition at said lean air-to-fuel ratio over to each other.

2. A fuel injection amount controller for engines according to claim 1, wherein said fuel amount correction means judges said engine to be in an accelerating condition when said pressure deviation exhibits an increase greater than a predetermined value, and increases the amount of the fuel depending upon said pressure deviation.

3. A fuel injection amount controller for engines according to claim 1, wherein:
   said fuel injection amount correction means judges said engine to be in a decelerating condition when said pressure deviation exhibits a decrease greater than a predetermined value, and decreases the amount of the fuel depending upon said pressure deviation; and
   said correction coefficient change-over means includes a time counting means for counting the passage of time after the operation condition at said lean air-to-fuel ratio has changed over to the operation condition at said stoichiometric air-to-fuel ratio, and changes said correction coefficient over to a suppressing direction when said passage of time is not longer than a predetermined period of time.

4. A fuel injection amount controller for engines according to claim 1, wherein:
   said fuel amount correction means judges said engine to be in an accelerating condition when said pressure deviation exhibits an increase greater than a predetermined value, and increases the amount of the fuel depending upon said pressure deviation, and judges said engine to be in a decelerating condition when said pressure deviation exhibits a decrease greater than a predetermined value, and decreases the amount of the fuel depending upon said pressure deviation; and
   said correction coefficient change-over means includes a time counting means for counting the passage of time after the operation condition at said lean air-to-fuel ratio has changed over to the operation condition at said stoichiometric air-to-fuel ratio, and changes said correction coefficient over to a suppressing direction when said passage of time is not longer than a predetermined period of time.

* * * * *